(12) United States Patent
Adjaz et al.

(10) Patent No.: US 11,810,110 B2
(45) Date of Patent: Nov. 7, 2023

(54) METHOD OF PROCESSING A TRANSACTION SENT FROM A PROOF ENTITY

(71) Applicant: Idemia Identity & Security France, Courbevoie (FR)

(72) Inventors: Aghiles Adjaz, Courbevoie (FR); Sébastien Bahloul, Courbevoie (FR)

(73) Assignee: Idemia Identity & Security France, Courbevoie (FR)

( * ) Notice: Subject to any disclaimer, the term of this patent is extended or adjusted under 35 U.S.C. 154(b) by 7 days.

(21) Appl. No.: 16/918,052

(22) Filed: Jul. 1, 2020

(65) Prior Publication Data

US 2021/0019746 A1 Jan. 21, 2021

(30) Foreign Application Priority Data

Jul. 19, 2019 (FR) ........................................ 1908239

(51) Int. Cl.
*G06Q 20/40* (2012.01)
*G06Q 20/34* (2012.01)

(52) U.S. Cl.
CPC ........... *G06Q 20/401* (2013.01); *G06Q 20/34* (2013.01)

(58) Field of Classification Search
CPC ...... G06Q 20/401; G06Q 20/40; G06Q 20/34; G06Q 40/02; G06Q 20/386

(Continued)

(56) References Cited

U.S. PATENT DOCUMENTS 11,139,955 B1 * 10/2021 So ..................... G06Q 20/3674
2007/0106892 A1 * 5/2007 Engberg ................. H04L 69/329
713/168

(Continued)

FOREIGN PATENT DOCUMENTS

EP 3 468 096 A1 4/2019

OTHER PUBLICATIONS

Mann, C. et al., "Two-factor authentication for the Bitcoin protocol," International Journal of Information Security, Published Apr. 5, 2016, vol. 16 (2), DOI: 10.1007/s10207-016-0325-1, pp. 213-226.

(Continued)

*Primary Examiner* — Scott S Trotter
(74) *Attorney, Agent, or Firm* — WOMBLE BOND DICKINSON (US) LLP (57) ABSTRACT

The present invention relates to a method of processing a transaction sent from a proof entity (1) connected to a verification entity (2);
the proof entity (1) having at least one secret key and a candidate authentication data, the verification entity (2) having the hash value of a reference authentication data;
the method comprising the steps of:
(a) generation by data processing means (11) of the proof entity (1) of:
a signature of the proof entity (1) from said secret key;
a zero-knowledge proof of the fact that the candidate authentication data and the reference authentication data match;
(b) transmission to the verification entity (2) of transaction data comprising at least:
said signature of the proof entity (1);
said zero-knowledge proof;

(Continued)

(c) verification by the data processing means (21) of the verification entity (2) that said signature of the proof entity (1) and the zero-knowledge proof are valid;
(d) processing said transaction.

14 Claims, 4 Drawing Sheets

(58) Field of Classification Search
USPC .......................................................... 705/44
See application file for complete search history.

(56) References Cited

U.S. PATENT DOCUMENTS

| | | |
|---|---|---|
| 2018/0270065 A1 | 9/2018 | Brown et al. |
| 2019/0103971 A1 | 4/2019 | Keuffer et al. |
| 2019/0197534 A1* | 6/2019 | Alastair ............. G06Q 20/3821 |
| 2020/0186355 A1* | 6/2020 | Davies ................. H04L 9/3221 |
| 2022/0138741 A1* | 5/2022 | Alt ..................... G06Q 20/3829 |
| | | 705/71 |

OTHER PUBLICATIONS

Sa'nchez, D.C., "Zero-Knowledge Proof-of-Identity: Sybil-Resistant, Anonymous Authentication on Permissionless Blockchains and Incentive Compatible, Strictly Dominant Cryptocurrencies," arxiv.org, Cryptography and Security (cs.CR), Cornell University Library, submitted on May 22, 2019, pp. 1-73.
Parno, B. et al., "Pinocchio: Nearly Practical Verifiable Computation," in Proceedings of the IEEE Symposium on Security and Privacy, IEEE, dated May 21, 2013, DOI: 10.1109/SP.2013.47, pp. 238-252.
Costello, C. et al., "Geppetto: Versatile Verifiable Computation," in Proceedings of the IEEE Symposium on Security and Privacy, IEEE, dated May 18, 2015, DOI: 10.1109/SP.2015.23, pp. 253-270.
Ben-Sasson, E. et al., "SNARKs for C: Verifying Program Executions Succinctly and in Zero Knowledge," in Proceedings of the 33rd Annual International Cryptology Conference, CRYPTO 2013, Date of Conference: Aug. 18-22, 2013, DOI: 10.1007/978-3-642-40084-1_6, pp. 90-108.
Ben-Sasson, E. et al., "Zerocash: Decentralized Anonymous Payments from Bitcoin," 2014 IEEE Symposium on Security and Privacy, Date of Conference: May 18-21, 2014, DOI: 10.1109/SP.2014.36, pp. 459-474.
Giacomelli, I. et al., "ZKBoo: Faster Zero-Knowledge for Boolean Circuits," in the Proceedings of the 25th USENIX Security Symposium, Aug. 10-12, 2016, pp. 1069-1083.
Correspondence from the French National Institute of Industrial Property Office (INPI—Institute National De La Propriété Industrielle) for FR1908239 dated Mar. 11, 2020; Preliminary Research Report of the French National Institute of Industrial Property Office for FR1908239 dated Mar. 5, 2020; and Written Opinion on the Patentability of the Invention issued by the French National Institute of Industrial Property Office for FR1908239.
English machine translation of Correspondence from the French National Institute of Industrial Property Office (INPI—Institute National De La Propriété Industrielle) for FR1908239 dated Mar. 11, 2020; Preliminary Research Report of the French National Institute of Industrial Property Office for FR1908239 dated Mar. 5, 2020; and Written Opinion on the Patentability of the Invention issued by the French National Institute of Industrial Property Office for FR1908239.

* cited by examiner

METHOD OF PROCESSING A TRANSACTION SENT FROM A PROOF ENTITY

CROSS-REFERENCE TO RELATED APPLICATIONS

This specification is based upon and claims the benefit of priority from French patent application number FR 1908239 filed on Jul. 19, 2019, the entire contents of which are incorporated herein by reference.

TECHNICAL FIELD OF THE INVENTION

The present invention relates to a method of processing a transaction sent from a proof entity, in particular in a "blockchain" type database.

STATE OF THE ART

Databases called blockchains have appeared in recent years.

A blockchain database is distributed among several storage nodes of a network. The storage nodes are configured to validate data written in the database by the implementation of a consensus search method among the storage nodes. One such method is for example the method known as "proof of work", or simply POW. The contents of the database are thus protected against falsification in spite of its distributed nature.

The most well-known blockchain database is the one used in the Bitcoin® electronic money transaction system. The database of the Bitcoin® system contains a history of all past transactions performed between accounts of users of the system. The need to use a centralized entity such as a bank in order to authenticate transactions is thus eliminated.

A client element storing a user's private key and enabling transactions to be carried out on the blockchain database is called "wallet". Although most wallets are client software installed on a personal terminal (computer, smartphone) or a remote server, some wallets called "hardware wallet" take the form of a hardware object such as a USB token storing the key autonomously (and separated from the network) in order to contribute a higher level of security.

Currently transactions on a blockchain, but also those using a bankcard type electronic payment means, are verified based on a single authentication factor of the "something the user has type", particularly said private key (stored in their "wallet"/on the chip of their bankcard/in a secured enclave of a personal terminal, etc.). This means that a hacker who succeeds in retrieving a user's secret key can very easily steal the identity of that user and carry out transactions without their knowledge.

It would be desirable instead to use very robust strong authentication methods (i.e. multiple authentication factors) specifically as defined by the FIDO Alliance specifications.

For example, the first authentication factor possessed by the user, called authenticator, is combined with something that the user "knows" or "is" (a code, a biometric trait, etc.).

It is known to perform the transaction from a mobile terminal such as a smart phone storing said secret key (thus, mobile payment services are known for iOS or Android— both for wallets of numerous blockchains as well as dematerialized bank cards) authorizing the transaction if an additional authentication on the mobile terminal is carried out successfully: typically the user must enter a PIN code or present a biometric trait (face or fingerprint) to the smart phone. Thus, a true biometric authentication is achieved because "something the individual has", i.e. their mobile terminal, is combined with "something the individual is/knows" as a second factor. However, this assumes that said mobile terminal is trustworthy: the rest of the transaction system has no assurance that the verification of the second factor has been carried out reliably and should be trusted, because the user's terminal could have been hacked.

It would therefore be desirable to have a new solution of strong authentication of a user seeking to carry out a transaction, which is universal, reliable and easy to implement.

OVERVIEW OF THE INVENTION

Thus, according to a first aspect the present invention relates to a method of processing a transaction sent from a proof entity connected to a verification entity;

the proof entity having at least one secret key and a candidate authentication data, the verification entity having the hash value of a reference authentication data;

the method comprising the steps of:
(a) generation by the proof entity's data processing means of:
  a signature of the proof entity from said secret key;
  a zero-knowledge proof of the fact that the candidate authentication data and the reference authentication data match;
(b) transmission to the verification entity of transaction data comprising at least:
  said signature of the proof entity;
  said zero-knowledge proof;
(c) verification by the verification entity's data processing means that said signature of the proof entity and the zero-knowledge proof are valid;
(d) processing said transaction.

According to other advantageous and non-limiting characteristics:

The proof entity also has the reference authentication data and/or a hash value of the reference authentication data, said transaction data transmitted in step (b) further comprising said hash value of the reference authentication data, and step (c) comprising the verification by the data processing means of the verification entity that the hash value received of the reference authentication data corresponds to that which the verification entity possesses.

The proof entity initially has only the reference authentication data and/or the hash value of the reference biometric data, the method comprising the implementation by data processing means of a trusted entity or of the proof entity of a preliminary step (a1) of:
  obtaining the candidate authentication data;
  generating the hash value of the candidate authentication data obtained.

The method comprises an even earlier step (a0) of generation by the proof entity's data processing means of the reference biometric data from a reference biometric trait associated with an official document; and of the hash value of the reference biometric data.

The zero-knowledge proof is a zkSNARK type cryptographic object.

Step (a) comprises the prior verification that the candidate authentication data and the reference authentication data match.

The candidate and reference authentication data are candidate and reference biometric data, the proof entity having, in addition to the reference biometric data, a hash value of the candidate biometric data and the hash value of the reference biometric data, said transaction data transmitted to step (b) further comprising said hash value of the candidate biometric data.

The candidate biometric data and the reference biometric data match if their distance according to a given comparison function is less than a predetermined threshold.

Said zero-knowledge proof of the fact that the candidate biometric data and the reference biometric data match is a zero-knowledge proof of the fact that, given two hash values, there is candidate biometric data and reference biometric data having for respective hash values the given hash values, such that their distance according to the given comparison function is less than the predetermined threshold.

The candidate and reference authentication data are a candidate code and a reference code, the candidate code and the reference code matching if their hash values correspond.

Said zero-knowledge proof of the fact that the candidate code and the reference code match is a zero-knowledge proof of the fact that, given a hash value, there is a candidate code having for hash value a hash value of the candidate code corresponding to said given hash value.

The proof entity is a user's personal electronic device such as a bank card, mobile terminal or personal computer.

Said transaction is in a blockchain database, step (d) comprising the generation of a block containing said transaction data transmitted in step (b) and the addition thereof in said blockchain database.

According to a second aspect, the invention relates to an arrangement for processing a transaction sent from a proof entity having at least one secret key, comprising said proof entity and a verification entity connected together, characterized in that:

the proof entity comprises data processing means configured for generating a signature of the proof entity from said secret key and a zero-knowledge proof of the fact that candidate authentication data and reference authentication data match, and transmitting to the verification entity transaction data comprising at least said signature of the proof entity and said zero-knowledge proof;

the verification entity comprises data processing means configured to verify that said signature of the proof entity and the zero-knowledge proof are valid.

According to a third and a fourth aspect, the invention relates to a computer program comprising code instructions for the execution of a method according to the first aspect of processing a transaction sent from a proof entity; and a storage means readable by computer equipment on which a computer program product comprises code instructions for executing a method according to the first aspect of processing a transaction sent from a proof entity.

DESCRIPTION OF THE FIGURES

Other characteristics, purposes and advantages of the invention will become clear from the following description, which is purely illustrative and non-limiting, and which must be read in the context of the attached drawings in which.

In the set of figures, similar elements are marked with identical references.

DETAILED DESCRIPTION OF THE INVENTION

Architecture

Figure 1A:
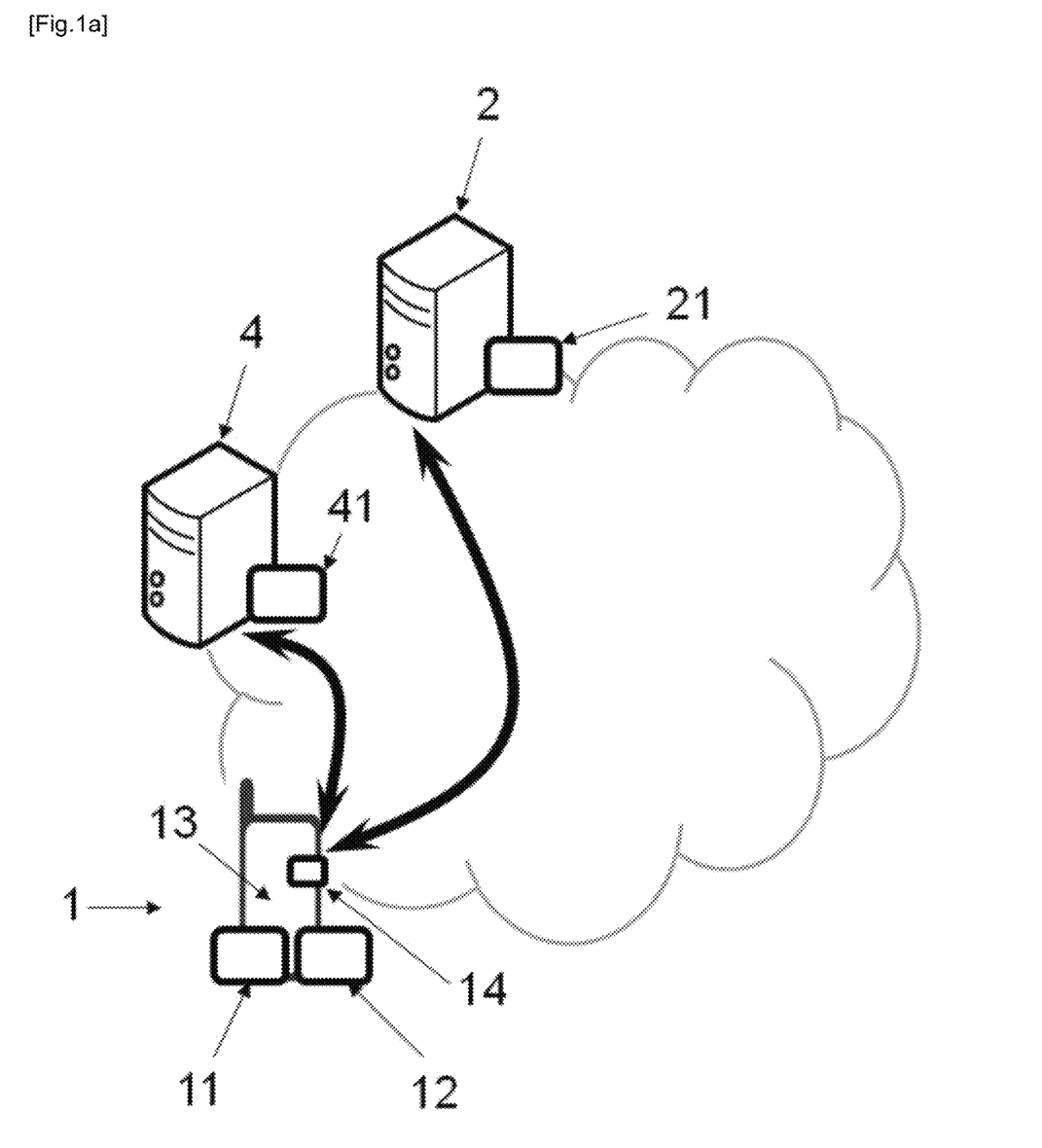
FIG. 1a schematically depicts a system for processing a transaction, according to a first embodiment.
Figure 1B:
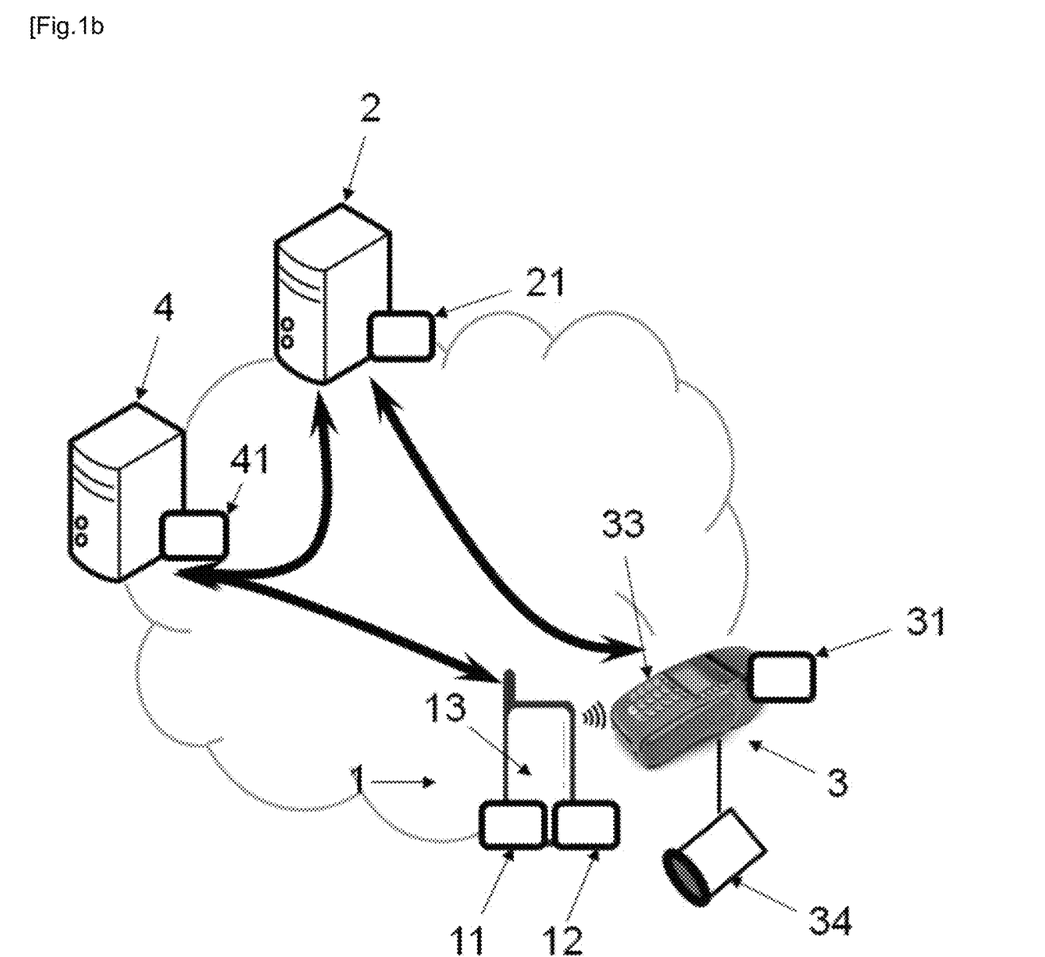
FIG. 1b schematically depicts a system for processing a transaction, according to a second embodiment.
Figure 1C:
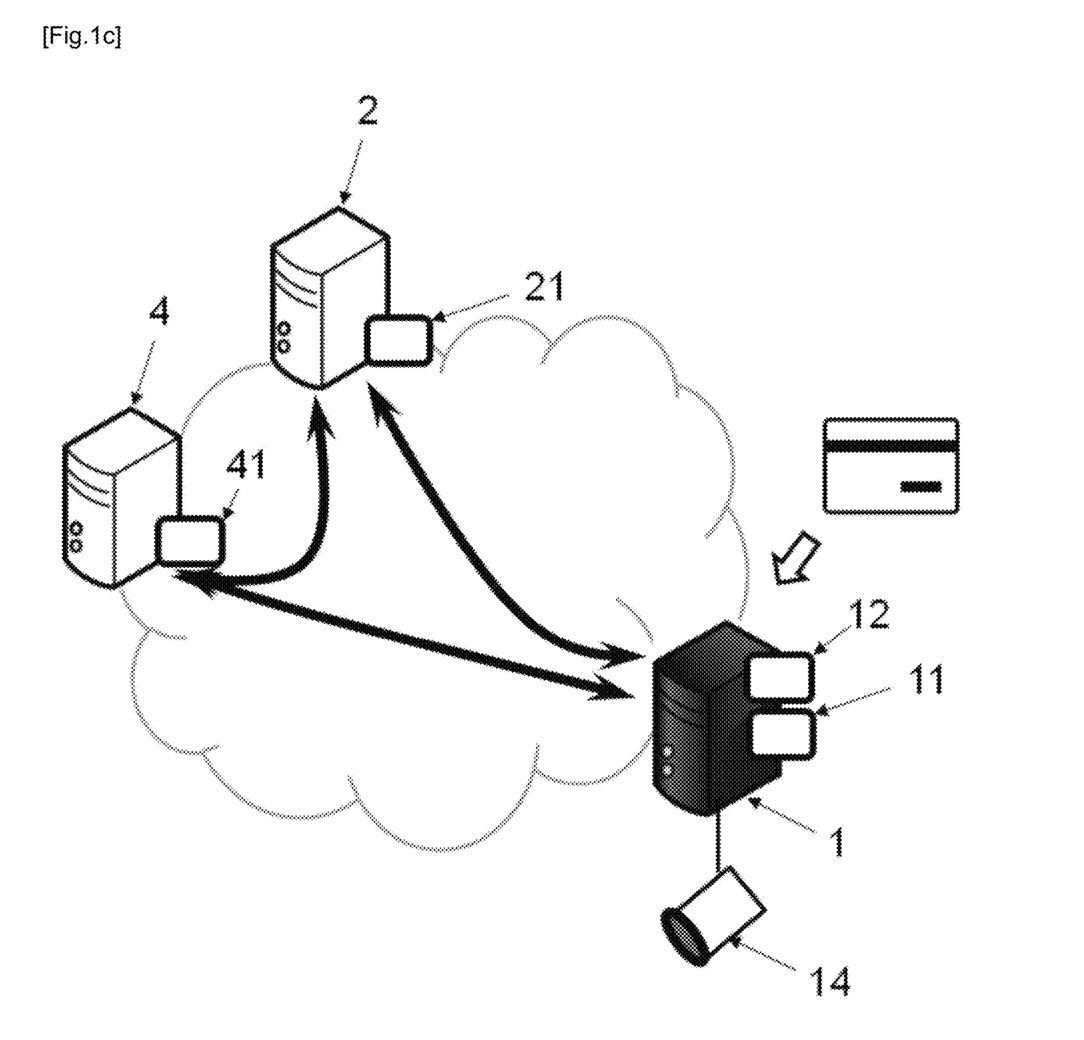
FIG. 1c schematically depicts a system for processing a transaction, according to a third embodiment.

With reference to FIGS. 1a, 1b, 1c, three cases of transaction systems for the implementation of the present method of processing a transaction with strong authentication are schematically depicted. By transaction, it is meant "payment", i.e. transfer of monetary units (possibly a cryptocurrency) between two parties. In the remainder of the transaction, the example of three different contexts, corresponding respectively to FIGS. 1a, 1b, 1c will be used:

transaction on a blockchain database (for example transfer of bitcoins);

transaction of payment by bankcard on a merchant's premises (called EMV—Europay Mastercard Visa);

transaction of online payment by bankcard.

In all these cases the system comprises at least two devices 1, 2. The first device 1 is advantageously a device specific to a user, such as for example their mobile telephone, or "smartphone", an electronic tablet or a personal computer, or even directly their bank card, and in general a client device through which the user wishes to perform the transaction (as explained, called wallet in a blockchain system). In every case, the first device 1 holds a secret key (we will come back to this later). This is the user of the first device 1 who "gives" the monetary units exchanged for the transaction.

The second device 2 is held and controlled by an entity with which the authentication must be carried out. The user of the second device 2 may be the one who "receives" the monetary units exchanged for the transaction, but not always.

In the case of a transaction on a blockchain database, the second device 2 is a transaction validating device called "blockchain node" and particularly a "miner" or another wallet. In the case of a bank card transaction, it generally involves a merchant server or a bank server intended to authorize or not a bank transaction.

One of the devices carries out an authentication of the user, and then furnishes the result to the other, which proceeds with the verification of this result. In that regard, according to a known plan, the first device 1 is an entity, called proof, which carries out the authentication and furnishes the result to the second device 2, called verification entity, which verifies said result. The first device 1 comprises data processing means 11, i.e. a computer such as for example a processor, a microprocessor, a controller, a microcontroller, an FPGA, etc. Said computer is suitable for executing code instructions for implementing the following method.

The first device 1 advantageously comprises a communication interface enabling it to dialogue remotely with the second device 2 and other optional devices such as a third device 3 which is an entity called trusted (furnished by a third party recognized by the entity with which the transaction must be carried out, for example a security service provider), and/or a fourth device 4 called the authority entity (for example governmental). It should be noted that the verification entity 2 and the authority entity 4 can be combined.

The first device can also comprise data storage means 12 (a memory, such as flash), a user interface 13 (typically a touchscreen), and optionally biometric acquisition means 14 (see below). Said communication interface is preferably the combination of a wireless communication interface, for example of the Wi-Fi or Bluetooth type or mobile telephone network (GPRS, 3G, 4G or other) and any other downstream communication network.

The second device 2 (and if applicable the third and/or the fourth device(s) 3, 4) also comprises data processing means 21 (respectively 31, 41), i.e. a computer such as for example a processor, a microprocessor, a controller, a microcontroller, an FPGA, etc. Said computer is suitable for executing code instructions for implementing the following method. Said other devices 2, 3, 4 advantageously also comprise communication interfaces enabling them to remotely dialog with each other and with the first device 1.

The second device 2 and the optional third device 3 are typically located in proximity (for example both on the premises of a merchant in the EMV system; possible architectures will be discussed later on), and in this respect can be hardwired together. The fourth device 4 is typically a remote device.

Preferably the first device 1 and/or the optional third device 3 are capable of generating biometric data from a biometric trait of an individual. The biometric trait can for example be in the form of the face, or one or more irises of the individual. The extraction of the biometric data is achieved by processing the image of the biometric trait, which depends on the nature of the biometric trait. Methods for processing a variety of images in order to extract biometric data are known to the person skilled in the art. By way of non-limiting example, the extraction of the biometric data can comprise an extraction of particular points of, or a shape of, the face in the case where the image is that of the individual's face.

The third device 3 and/or optionally the first device 1 comprises for such purpose biometric acquisition means 14, 34, typically an image sensor, for example a digital photographic apparatus or a digital camera, suitable for acquiring at least one image of a biometric trait of an individual.

Transactions

It is assumed that the transaction is sent from the proof entity 1. In every case, it is assumed that the proof entity 1 has a secret key, which conventionally allows it to sign descriptive data of the transaction. More specifically, the data processing means 11 of the proof entity can in the first step (a) of the method generate a signature of the proof entity 1 based on said secret key, said signature constituting a first authentication factor of the "what I have" type.

Here, by "signature of the proof entity 1", it is meant a digital signature allowing to identify who appended it (the proof entity), and in particular a signature of data descriptive of the transaction (amount, public key of the recipient, etc.). by analogy with the handwritten signature of a paper document. In a known fashion, such a digital signature of the proof entity 1 is generated by applying to the data to be signed (data descriptive of the transaction) a cryptographic algorithm using the secret key of the proof entity 1, for example a hash value (see below) of these data is ciphered.

According to a first embodiment illustrated in FIG. 1a, said transaction is on a blockchain database (for example transfer of bitcoins).

It is assumed that a read/write access account in the blockchain database has been created by the user of the proof entity 1. The creation of the account comprises the assignment to the user of two mutually associated keys previously mentioned: a private signature key, specific to the user, and a public signature verification key also specific to the user.

Both of the user's keys are memorized in a memory 12 of the proof entity 1 at the request of the user, and/or are predetermined.

Any data written in the database at the request of an entity holding an access account to the database can be signed prior to its being written by means of the private key specific to that entity. Conversely, all signed data read in the database by a third party holding an account with access to the database can be verified by means of the public key specific to the entity, so as to obtain the data originally furnished by the entity.

Said signature, denoted ScriptSig for Bitcoin, is for example produced using elliptical curve cryptography, called ECDSA. In this instance, the curve used in the Bitcoin system is secp256k1. Generally speaking, any transaction on a blockchain database is defined by a set of data that are descriptive of the transaction, comprising at least an indication of an amount of the transaction and an "output", i.e. the public key, or at least the hash value of that public key, denoted scriptPubKey for Bitcoin, of the beneficiary (the one who receives a certain amount of a monetary unit such as Bitcoins). There can be a plurality of outputs, each associated with an amount. Advantageously, the data descriptive of a transaction further include an "input", i.e. the identifier, denoted previous tx for bitcoin, of one or more previous transactions (i.e. the beneficiary whereof is the sender of the present transaction) the output amount whereof is sufficient to cover the transaction, i.e. substantiating the availability of funds for the transaction. A transaction always balances the inputs and outputs thereof.

It is then easy for the sender to verify:
that it has the public key hashing in the hash value entered into the output of said previous transaction, and
that the signature thereof corresponds to said public key (and therefore that it actually possesses the respective private key).

By "hash value" of data (also called "condensate" or "hash" of the data), obtained by applying cryptographic hashing to the data (typically SHA-1 or SHA-2 families, particularly SHA-256). The footprint has a fixed size and reveals nothing about the data for which it is issued: the original data cannot be retrieved from this footprint, in any case as long as the hashing function used is considered secure. However, the footprint can be recalculated from the data in order to verify that it is correct.

According to a second embodiment illustrated in FIG. 1b, the transaction is a payment type by bankcard on the premises of a merchant, i.e. a bankcard or a mobile terminal emulating a bankcard is connected to an EFTPOS type (electronic funds transfer at point of sale) electronic payment terminal (EPT) of the merchant. This connection is more and more often contactless (NFC), but can still be by insertion of the card in a reader.

In this configuration, the card/mobile terminal is the proof entity 1, the EPT can be is optionally a trusted entity 3, and a remote server of a banking agency is the verification entity 2. The proof entity 1 is typically connected to the verification entity 2 via said trusted entity 3.

This time asymmetric encryption is used, i.e. a private key is associated with the bankcard (physical or dematerialized), the private key being stored both directly on the chip of the card if it is physical or in a memory of the terminal if it is dematerialized, and also stored by the bank server. Conventionally, data descriptive of the transaction are entered by the merchant on the EPT, and sent to the card/terminal for said signature to be affixed based on the secret key. In the same way as for blockchains, a remote bank server can verify that the signature is valid, and authorize the transaction. An asymmetric encryption (a private key and a public key) can be used in the same way as in the preceding embodiment to assure the EPT that the card used is authentic and is not a copy.

According to a third embodiment illustrated in FIG. 1c, the transaction is of online payment type. Generally, the proof entity 1 is then a terminal such as a mobile terminal, a computer on which the user enters the number of his card and/or the associated visual cryptogram and/or the expiration date of the card, but this could directly be the card if it has a network connectivity. The remote server of a merchant is the verification entity 2.

In such case, the secret key is composed of the n-tuple (preferably the triplet) number of his card (called "PAN") and/or the associated visual cryptogram (called "CCV", "CVC" or "CVV") and/or the expiration date of the card, which constitutes an authentication factor of the "what I have" type, the associated signature being a hash value function of said number of his card and/or associated visual cryptogram and/or expiration date of the card. Said hash value can easily be verified by said remote server (either by a dedicated function, or by submitting said hash value to a bank server capable of recalculating it. Generally, from the card number and the validity date the bank verifies that the visual cryptogram received is good).

Strong Authentication

The present invention intends to add a second authentication factor ("what I know" or "what I am") at the time the transaction is initiated, while making a part of the verification remote.

Thus the device 1 implements an authentication of the individual, i.e. compares an authentication data called candidate, because it is freshly acquired, to a reference authentication data, i.e. what is expected. Authentication data is understood to mean any data enabling an individual to be distinctively identified.

According to a first variant, said authentication data is a code, for example a PIN code (code is understood as a password, i.e. a series of characters kept secret). Now, the reference authentication data is a reference code, i.e. an expected code, and the authentication data is a candidate code, i.e. a code entered by the user which is going to be verified.

According to a second variant, said authentication data is a biometric data, such that a biometric data called candidate, freshly acquired from the individual, is compared to a single biometric called reference, assumed to come from the same individual, in order to verify that the individual from whom both data have been obtained is one and the same.

In this case, the reference biometric data used for the authentication is advantageously a data recorded in an identity document of the individual. For example, the biometric data can be an image of the face included on an identity document, or an image of the face or at least of an Iris of the individual recorded on a radiofrequency chip contained in the document.

Enrollment

As explained, the present method is intended to ensure that the verification entity 2 only needs to have a proof of authentication of the individual presented, but not authentication data. It is understood, therefore that the verification entity 2 can be sure "with its own eyes" of the reality of the two authentication factors (i.e. of the strong nature of this authentication), without the risk of compromising the user's authentication data.

Thus, the basic assumption is that at the start of the method the proof entity 1 has a candidate authentication data and a reference authentication data and/or a hash value of the reference authentication data. The verification entity 2 only needs to have the hash value of the reference authentication data and/or the hash value of the candidate authentication data.

In the case of biometric data, the proof entity 1 more specifically has the candidate authentication data, a reference biometric data, a hash value of the reference biometric data, a hash value of the candidate biometric data.

As explained, the hash value of an authentication data can thus be transmitted to any device without disclosing information about the data itself and therefore about the privacy of the user.

Figure 2:
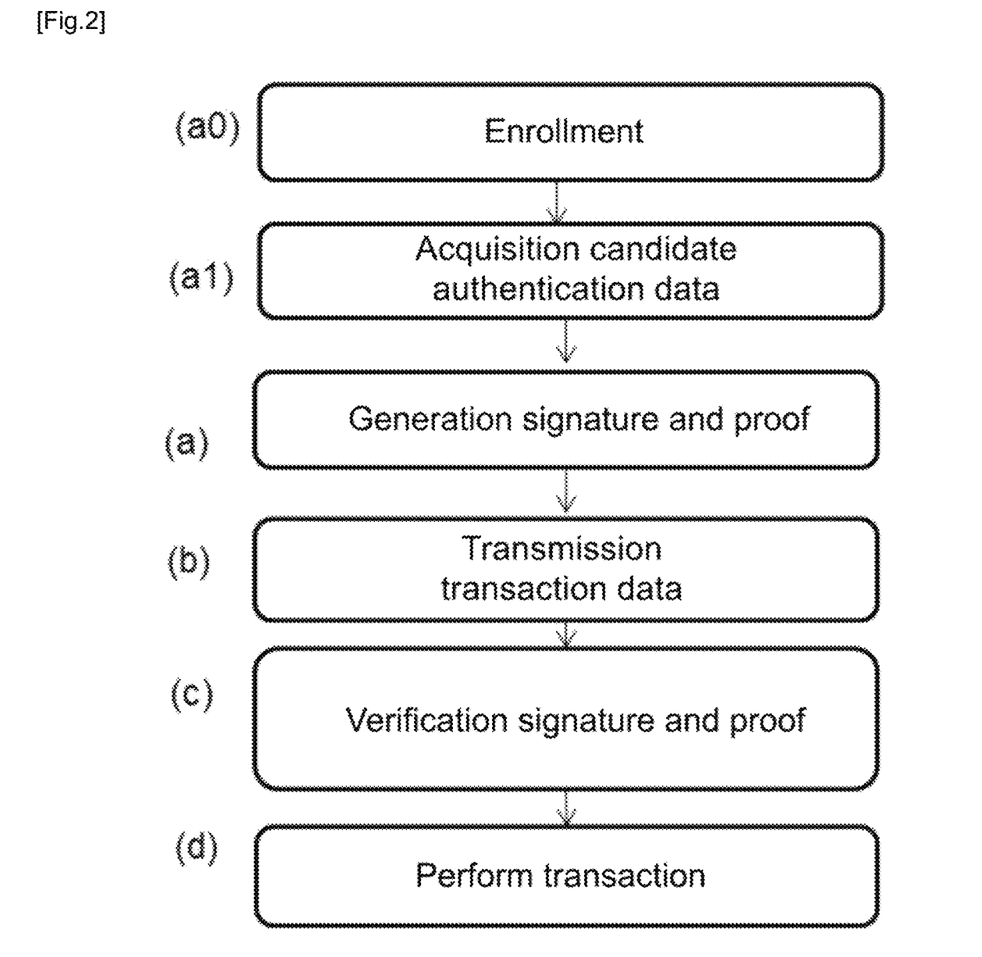
FIG. 2 is a flowchart of steps of a method for processing a transaction implemented in a system represented in any one of FIGS. 1a, 1b, 1c.

In a preferred embodiment, with reference to FIG. 2, the method comprises a preliminary step (a0) of "enrollment" enabling the reference authentication data (or the hash value of the reference authentication data) to be made available on the proof entity 1. This step can be implemented long before the rest of the method, and does not need to be repeated with each occurrence of the method (for example, it can be done once per year).

Typically, this step comprises:
  obtaining the reference authentication data by the proof entity 1, i.e. in the case of biometric data, the generation by the data processing means 11 of the proof entity 1 of the reference biometric data from a reference biometric trait associated with an official document (in particular an identity document such as a passport or an identity card), or in the case of a reference code, it is generally predetermined (typically, the user receives his bank card with its code); and/or
  obtaining the hash value of said reference authentication data (always by application of a given hashing function) by the proof entity 1.

It is understood that in the end the proof entity 1 can have the reference authentication data and/or the hash value thereof. For example, if the authentication data is a code, it is sufficient for the proof entity 1 to have the hash value of the reference code, while if it is a biometric data it needs the "non-hashed" reference data.

This step (a0) can be administered by the authority entity 4, if there is one, which can generate or validate the reference authentication data and transmit to the verification entity 2 the hash value of said reference authentication data. In the blockchain embodiment, it is understood that said hash value of the reference biometric data can be stored (in particular by the proof entity 1 itself) in the block chain, so as to be available publicly including by the verification entity 2. For example, for a biometric data, the user can directly retrieve on his terminal 1 the biometric trait recorded in a radiofrequency chip contained in the document (if the device 1 has a NFC type radiofrequency reader), take a photograph of said document with his means 14, or a photograph of himself, if appropriate in the presence of a representative of the authority (for example at a counter in the City Hall), then have the biometric data generated as reference data validated by the authority entity 4.

Thus, step (a0) preferably comprises the transmission to the authority entity 4 of the official document (or at least a photograph), of the reference biometric data, and of the hash value of the reference biometric data, and after verification, furnishing to the verification entity the hash value of the reference biometric data to the verification entity 2.

This verification can be done in numerous ways, and simply consists in verifying that the reference biometric data submitted for verification is consistent with the official document, and that the footprint is that of the submitted data.

In general, it will be understood that step (a0) may be implemented in any way making it possible to securely furnish to the first device 1 the reference biometric data signed by an authority, for example governmental or banking.

It should be noted that this step (a0) can further comprise the generation and supply of said secret key to the proof entity, i.e. to be for example to be implemented at the request of his bank card or upon opening his account with the blockchain database.

Obtaining the Candidate Authentication Data

It is assumed, as explained, that on the one hand the proof entity 1 has a candidate authentication data, and on the other hand a reference authentication data and/or a hash value of the reference biometric data. As explained, these latter two can be previously obtained during an enrollment step (a0).

As regards the "fresh" candidate authentication data, it can be obtained during a preliminary step (a1). In other words, the proof entity 1 initially (i.e. upon completion of step (a0)) may only have the reference authentication data and the hash value of the reference authentication data.

It is important to understand that although the enrollment step (a0) can be performed weeks before the implementation of the authentication, step (a1) is at worst carried out several minutes prior to the rest of the method, to guarantee the "freshness" of the candidate authentication data. Step (a1) is implemented by the data processing means 11, 31 of the proof entity 1 or of the optional trusted entity 3.

In fact, the proof entity 1 does not necessarily have means 13, 14 of acquiring the candidate authentication data (for example, case of the bank card). In this respect, the trusted entity 3 may be an EPT comprising a keypad 33 for entering a code, or an automatic device furnished by the supervisory authority (and placed beside the EPT, for example) equipped with its own biometric acquisition means 34 such as a fingerprint scanner or a camera. Alternatively, a computer used as a wallet or a mobile terminal used as a dematerialized bankcard generally has its own interface 13 and its own biometric acquisition means 14.

Step (a1) first comprises obtaining the candidate authentication data, then the generation of the hash value of the candidate authentication data obtained.

In the biometrics case, step (a1) comprises the generation of the candidate biometric data from a biometric trait furnished by the biometric acquisition means 14, 34 of the proof entity 1 or the trusted entity 3. It is observed that although step (a1) can be implemented by the proof entity 1, i.e. the user can use a biometric trait furnished by the biometric acquisition means 14 of his own device 1, it is preferred if possible to use the trusted entity 3 so as to avoid the user "falsifying" the biometrics by putting on a mask, for example. In this respect, the biometric acquisition means 34 preferably are capable of detecting the living, so as to ensure that the candidate biometric data is produced from a "real" trait.

Finally, if applicable the trusted entity 3 transmits to the proof entity 1 at least the obtained candidate biometric data and optionally the hash value generated from the candidate biometric data (in fact, the proof entity itself can generate it); and/or to the verification entity 2, (only) the generated hash value of the candidate biometric data for purposes of subsequent verification. Moreover, for security it is preferably provided that the candidate biometric data be deleted from the trusted entity 3 once transmitted to the proof entity 1.

General Method

The present method is non-interactive, i.e., it only requires "one way" travel of information from the proof entity 1 to the verification entity 2, and no "return". More importantly, as explained, the verification entity will receive neither the reference authentication data nor the candidate authentication data (nor any data that would make it possible to get back to those data), even though it is possible for the validation entity to know with certainty whether the candidate and reference authentication data match, and without the need to have particular confidence in the proof entity 1.

For this purpose, a cryptographic protocol is used, generating a "proof" that the candidate authentication data and reference biometric data match, said proof revealing nothing other than the fact that said authentication data are actually possessed by the producer of the proof. The Pinocchio protocol presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013" was one of the first verifiable calculation protocols for enabling the implementer to verifiably compute the application of any function and the order giver to verify the associated proof within a calculation time less than what is needed to perform the calculation itself.

In a first step (a), for this purpose the data processing means 11 of the proof entity 1 generate, in addition to a signature of the proof entity 1 from said secret key, a zero-knowledge proof of the fact that the candidate authentication data and the reference authentication data match. Thus, the two hash values can be bound to the candidate and reference authentication data, but no information can be obtained about the content of said authentication data. The cryptographic protocol provides a quick (less than half a second) proof to verified and one that cannot be falsified: it is nearly impossible (probability of less than $\frac{1}{2}^{80}$, even less than $\frac{1}{2}^{128}$ depending on the parameters selected to produce the proof, the latter therefore being slower to produce) for a proof of the statement above to be accepted if the process is not carried out in accordance with specifications.

In producing the proof, the proof entity 1 uses the possibility of producing zero-knowledge proofs to conceal the authentication data. Thus, the proof provides no information about the authentication data themselves.

Naturally, step (a) advantageously comprises the prior verification that the candidate authentication data and the reference authentication data match (always on the proof entity 1, i.e. the user's personal terminal), by comparing the candidate authentication data and the reference authentication data, or the hash values thereof.

Indeed, in a known way, a reference code and the candidate code match if their hash values correspond, i.e. are identical. This explains why it is not necessary for the proof entity to have the reference code, but only the hash value thereof. The proof is then more precisely a zero-knowledge proof of the fact that, given a hash value (reference in this instance), there is a candidate code having for hash value a candidate hash value corresponding to said given hash value (since the hash values of the candidate and reference codes are identical). Naturally, it is still possible to compare directly the reference code and the candidate code;

a candidate biometric data and a reference biometric data match if their distance according to a given comparison function is less than a predetermined threshold. Two biometric data will never be exactly identical, so it is not possible at that point to directly compare their hash values.

Thus, in the biometric case, the implementation of the comparison comprises the calculation of a distance between the data, the definition whereof varies based on the nature of the biometric data considered. The calculation of the distance comprises the calculation of a polynomial between the components of the biometric data, and advantageously, the calculation of a scaler product.

For example, in a case where the biometric data have been obtained from images of an iris, a conventional distance used for comparing two data is the Hamming distance. In the case where the biometric data have been obtained from images of the individual face, it is common to use the Euclidean distance.

This type of comparison is known to the person skilled in the art and will not be described in more detail hereinafter.

The individual is authenticated if the comparison reveals a rate of similarity between the candidate data and the reference data exceeding a certain threshold, the definition whereof depends on the calculated distance.

The proof is then more precisely a zero-knowledge proof of the fact that, given two hash values, there is a candidate biometric data and a reference biometric data having for respective hash values the given hash values such that their distance according to the given comparison function is less than a predetermined threshold.

Generation of Proof

Preferably, said zero-knowledge proof is a cryptographic object like zkSNARK.

zkSNARK means "zero-knowledge Succinct Non Interactive ARgument of Knowledge", i.e. Argument of non-interactive knowledge with zero disclosure of knowledge. It involves a cryptographic primitive constructed around the idea of proof. Researchers in theoretical computer science and cryptography have long been interested in the idea of proof. There are theoretical results allowing a very short, secure proof to be produced from an algorithm, but the time for producing such proof is out of reach and will remain so in spite of the increase in computing power of computers. One of the reasons lies in the power given to the entity that produces the proof, the proof entity 1 (also called the prover). In the theoretical results on proofs, the prover has infinite computing power and the proofs remain secure in spite of this. The idea of proof was then relaxed, the protocol seeking only to protect itself from a prover that would have significant but limited computing power. The result of the protocol is no longer a proof but an argument. It is from this idea of argument that practical systems of verifiable calculation are constructed. An additional requirement in a system producing an argument is that said argument not be interactive: the verifier and the prover do not need to interact in order to produce the argument. zkSNARKS implementations have been presented since 2010: this involves arguments of short size (a few elements of an elliptical curve), which do not need interactivity and which in addition enable the prover to perform a zero-knowledge proof, i.e. the proof does not contain any non-trivial information about the inputs furnished by the prover.

There are various protocols that specifically produce zkSNARKs, and the skilled person will be able to use them interchangeably in this method:
  the Pinocchio protocol, already mentioned;
  the Gepetto protocol, introduced in the publication "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, May 18, 2015," which is an improvement of Pinocchio
  The protocol introduced in the publication and subsequent ones "Eli Ben-Sasson, Alessandro Chiesa, Daniel Genkin, Eran Tromer, Madars Virza. SNARKs for C: Verifying Program Executions Succinctly and in Zero Knowledge. In Proceedings of the 33rd Annual International Cryptology Conference, CRYPTO '13, pages 90-108, 2013," implemented open-source in the form of a library called libsnark, optimizing the protocol producing a zkSNARK in Pinocchio by improving the expressivity, i.e. the type of programs or algorithm that can be verified.

Taking the Pinocchio protocol as an example, it comprises a plurality of parts:
  1. A conventional program is translated in the form of an arithmetic circuit, i.e. a set of relations between the inputs and outputs of the program that are translated solely by means of additions and multiplications of elements of a finite body. It should be noted that in theory all the programs can be translated in this form, but only a portion of these programs allows effective translation into circuit form.
  2. The arithmetic circuit obtained is represented effectively by means of three families of polynomials to which one additional polynomial is added, called target polynomial. These families of polynomials form "Quadratic Arithmetic Programs" (QAPs). They encode the relations between the inputs and outputs of each multiplication gate of the circuit, the relations of the addition gates being integrated into the first multiplication gate that follows in the calculation.
  Said QAPs are connected to the verifiable calculation by the following point: a calculation $y=C(x)$ is correct for an input x if and only if all the relations describing the corresponding arithmetic circuit are satisfied by setting x as input value and y as output value.
  The QAPs in a way make it possible to compress all the constraints to be verified into one single relations to be verified: a polynomial constructed from the value x and the three families of the QAP must divide the target polynomial.
  3. A cryptographic protocol then takes a QAP as input associated with a program, generates evaluation and verification keys that use elliptical curves to conceal the polynomial relations. The polynomial proving that the calculation has been correctly performed is then computed directly by means of the relations concealed in the elliptical curve. The divisibility relation is translated only by means of a constant number of elements of the elliptical curve, i.e. the proof is of constant size. The verification of said proof is extremely quick.

In addition, the protocol makes it possible to ensure that inputs from the calculation furnished by the prover are private: it enables the values of the prover to be concealed in the production of the proof by multiplying them by a multiple of the target polynomial, which does not change the fact that the "proof polynomial" is divisible by the target polynomial.

Said "proof" polynomial, when it is concealed in an elliptical curve, constitutes a zkSNARK. The Pinocchio protocol enables the zkSNARK that performs the proof to conceal some of the inputs of the calculation by which the proof is being done. In this case, it involves producing the following calculation:

Code Case

Input: the hash value of the reference code $h_{ref}=H(t_{ref})$, the result of the comparison of the hash value of the reference code $h_{ref}$ and of the hash value of the candidate code $h_{fresh}=H(t_{fresh})$, (i.e. the Boolean based on whether they match or not), and a IV initialization vector Private input: the candidate code $t_{fresh}$.

Output: the proof $\pi$ that the prover clearly knows a candidate code $t_{fresh}$ that is hashed as $h_{fresh}$ and the result of the comparison whereof is the one expected (h_ref=h_(fresh)).

Biometric Case

Input: the hash values of the candidate biometric $h_{fresh}=H(t_{fresh})$ and reference $h_{ref}=H(t_{ref})$ data, the result of the comparison of the candidate biometric $t_{fresh}$ and reference $t_{ref}$ data (i.e. the Boolean based on whether they match or not), and a IV initialization vector Private input: the candidate $t_{fresh}$ and reference $t_{ref}$ biometric data.

Output: the proof $\pi$ that the prover clearly knows biometric data $t_{fresh}$ and $t_{ref}$ that are hashed as $h_{fresh}$ and $h_{ref}$ and the result of the comparison whereof is the one expected.

It should be noted that protocols are known that are provided for the generation of a proof of proper operation of a hashing function, that the skilled person will be able to use directly even if they are not optimal. The difficulty is in obtaining a reasonable calculation time for producing the proof, and evaluation and verification key sizes that are not excessive.

The Zerocash protocol (IEEE Security & Privacy 2014) of Ben-Sasson et al., proposes the definition of an arithmetic circuit in order to verify the SHA-256 compression function, which includes about 30,000 multiplication gates. This offers a proof production time of about 5 seconds (per compression level, verifying the full hashing function, which comprises numerous iterations of the compression function, will clearly be longer), which remains high and significantly improvable. The ZKBoo protocol, introduced in the publication "ZKBoo: faster zero-knowledge for boolean circuits" by Giacomelli, Madsen and Orlandi (Usenix Security 2016)" enables better performance (proof in 50 ms, verification in 70 ms) per iteration of the compression function, but the size of the proof is significant (800 Kb) especially since it only seems to have been measured on an application of the compression function.

The Rest of the Method

In a step (b), the proof entity 1 transmits to the verification entity 2 the transaction data comprising at least:
said signature of the proof entity 1;
said zero-knowledge proof;
generally other descriptive data about the transaction (amount, public key of the recipient, etc.), in particular the data signed with said signature.

It can also include the hash value of the reference authentication data and/or the hash value of the candidate authentication data, particularly in the biometrics case, and if they have not already been transmitted. To repeat, the authentication data themselves are not transmitted.

In a step (c), the data processing means 21 of the verification entity 2 verify that said signature of the proof entity 1 is valid, and that the zero-knowledge proof is valid.

It can also be verified that a hash value received for the candidate and/or reference authentication data corresponds to the one the verification entity 2 has (in other words that the reference data that was used is what was provided, and/or that the candidate data is the fresh data extracted just previously in step (a1) in the biometric case).

If that is the case, the user is authenticated, and in a step (d) the transaction can be processed (see below).

Verification of the signature of the proof entity 1 is well known to the person skilled in the art, for example by using a public key as explained above. For example, if the signature is a cipher of a hash value of data transmitted with the signature (data representative of the transaction), this hash value is recalculated from these data and compared with the result of the deciphering of the signature (i.e. the hash value ciphered in the signature).

Verification of the proof is not interactive (the verification entity 2 has no need to contact the prover, i.e. the proof entity 1) and is done simply in constant time by verifying that the proof is valid, which shows (with extremely low probability) to the verification entity 2 that the claimed ownership is true, i.e. that the user has a candidate authentication data and a reference authentication data that match. Thus, it is proven that the identity of the user is confirmed (and that no one has stolen an identity) in spite of the absence of authentication data.

Thanks to the proof, confidentiality can be total (since the generation of the proof does not need communication) without the verification entity 2 taking any risk since the proof guarantees it that the proof entity indeed has authentication data.

The proof is short (indeed very short—on the order of a few hundred bytes), so transmitting it with the hash values of the document poses no bandwidth problem. Furthermore, verification of said proof is quick (in constant time, a few tens of thousandths of seconds), which does not increase the computation load at the data processing means 21 of the verification entity 2, which potentially must manage hundreds of simultaneous authentications. As regards generation of the proof, it requires more computation time, but since step (a) is implemented at the first device 1 which is personal (and is only involved in the authentication of its sole owner), said additional computation time is not problematic (on the order of a second).

Thus, the present method is optimal for the both user as well as for third parties.

Blockchain Case

As was explained, the database is a blockchain database, namely a database memorized by a plurality of storage nodes that are configured to validate data written in the database by the implementation of a consensus search method among the storage nodes. One such method is for example the method known as "proof of work". The contents of the database are thus protected against falsification in spite of its distributed/decentralized nature. Each block generally has:
contents of the block (or payload), generally composed of descriptive data of a set of transactions;
a header of the block, containing descriptive data of the block itself, i.e. information such as an identifier of the block, and identifier of the preceding block in the blockchain, a nonce, a version number, a timestamp, a level of difficulty, etc.

The example can be used of a database according to the one used by the Bitcoin® transaction system. Thus, data descriptive of a transaction between two wallets of a certain amount in Bitcoins could be memorized in the database 3.

The principal function provided by a verification entity 2 is to validate the transactions submitted to the blockchain, and if it is a miner it also has the role of "miner" of new blocks in said blockchain. Each time a set of transactions is validated, it constitutes one block. If said block fulfills certain specific criteria in the block chain of the transaction system (see below), it is then added to the top of the chain and the verification entity 2 which has constituted that block is rewarded for its work.

Step (c) is then written in an existing task of verification of the validity of the data of the transaction that are transmitted in step (b) prior to the mining of a block, so as to ensure that the transaction is not fraudulent (verification of the signature of the sender, i.e. the proof entity 1, of the existence of the beneficiary, and if applicable the availability of funds, but also that the transaction is not already in another block). Thus, the proof that the possible inputs thereof (hash value of the candidate and/or reference authentication data) can be inserted into a suitable field, in particular the OP_RETURN existing in Bitcoin transactions (with a size of 80 bytes).

If verification of step (c) is conclusive, step (d) preferably further comprises the generation and addition to said blockchain database of a new block composed of descriptive data of a set of transactions comprising said transaction data received in step (b), i.e. the assembly of said transaction set as contents of the block, in such a way that any third party accessing the database will be able to determine, once this block is published, the existence of the transaction, and to access all the verification data including the proof and/or the hash values of the candidate and/or reference authentication data. This step is preferably implemented or at least attempted by the verification entity 2 if it is a miner.

In the Bitcoin example, within a block (in the contents thereof), the transactions are stored in the form of a Merkle tree. The header is then attached to the block, and it involves the complex part. Conventionally, this part consists in the determination of the value of a nonce associated with the block (and generally of the values of the header of the block) such as a specific criterion in the block chain of the transaction system is verified.

Preferably this criterion is at least a function of the nonce and of a fragment of the contents of the block, particularly a condition on a hash value of an n-tuple of at least said nonce and the fragment of the contents of the block, in particular the fact (in the Bitcoin case) that said hash value begins by a certain number of zeros depending on the actual level of difficulty. The present method will not be limited to this embodiment, and the condition for example may involve a signature of the block.

Said fragment of the contents of the block is advantageously an indirect footprint of the set of transactions of the block, for example the root of the tree of transactions of the block if they are stored in the form of a Merkle tree.

Said hash value of an n-tuple of at least said nonce and the fragment of the contents of the block advantageously constitute an identifier of the block.

Preferably said n-tuple advantageously further comprises the identifier of the preceding block, and in a particularly preferred way it involves a sextuplet composed of:
- the version number,
- the hash value of the preceding block,
- said fragment of the content of the block (the root of the tree of the transactions of the block),
- the timestamp (for example time elapsed since midnight Jan. 1, 1970, in seconds),
- the level of difficulty,
- the nonce.

In practice, step (d) is attempted simultaneously by a large number of miners; the determination of the proper value of the nonce generally consists of testing a large number of values until the criterion is verified. Once the proper value of the nonce is determined, all the data above can be entered into the header of the block, and that block submitted to the other verification entities 2, which verify its validity (by verifying said criterion, i.e. by recalculating said hash value of an n-tuple of at least said nonce and the fragment of the contents of the block) before re-disseminating it in turn, and to add it to the database following the chain. The miner is then remunerated and the others must begin again to work on a new block.

At this stage, the generated block is public and the transactions it contains can be seen by everyone, including the proof entity 1.

Banking Case

If the transaction is by bankcard on a merchant's premises or on line, step (d) comprises the return receipt of an authorization of the transaction to the proof entity 1 and a merchant device (an EPT 3 or a merchant server), so as to inform the proof entity 1 that the transaction data that it has furnished are correct, that the transaction will be able to be processed.

The transaction per se will be able to be carried out in a known manner.

Equipment

According to a second aspect, an assembly for processing a transaction sent from a proof entity 1 is proposed for the implementation of the method according to the first aspect.

The assembly comprises the proof entity 1 (first device), and a verification entity 2 (second device), that are connected together, and if applicable, a trusted entity 3 (third device) and/or an authority entity 4 (fourth device).

The proof entity 1, which is typically a personal device of the user such as a smart phone, comprises data processing means 11 configured to generate a signature of the proof entity 1 from a secret key it possesses, and a zero-knowledge proof of the fact that candidate authentication data and reference authentication data match, and to transmit to the verification entity 2 transaction data comprising at least said signature of the proof entity 1 and said zero-knowledge proof.

The data processing means 11 can also be configured, if the authentication data is biometric data, to generate the reference biometric data from a reference biometric trait associated with an official document, and the hash value of the reference biometric data.

The verification entity 2 preferably never has reference or candidate authentication data, only a hash value of the reference biometric data.

It comprises data processing means 21 configured to verify that said signature of the proof entity 1 and the zero-knowledge proof are valid, and if applicable that the received hash value of the reference authentication data matches one in possession of the verification entity 2.

The optional trusted entity 3 comprises biometric acquisition means 34 and data processing means 31.

If applicable, the latter are configured for:
- generating the biometric-type candidate authentication data from a biometric trait furnished by the biometric acquisition means 34 and the hash value of the candidate biometric data obtained;
- transmitting to the proof entity 1 at least the candidate biometric data obtained (and generally the hash value of the candidate biographic data); and (optionally) to the verification entity 2 the hash value generated from the candidate biometric data.

Computer Program Product

According to a third and a fourth aspects, the invention relates to a computer program product comprising code instructions for execution (in particular on data processing means 11, 21, 31, 41 of the entities 1, 2, 3, 4) of a method according to the first aspect of the invention for processing a transaction sent from a proof entity 1, as well as storage means readable by computer equipment (a memory of the entities 1, 2, 3, 4) on which said computer program product is located.

The invention claimed is:

1. A method for performing a transaction in a blockchain database sent from a proof entity connected to a verification entity;
   the proof entity having a secret key, the verification entity having the hash value of a reference authentication data;
   wherein the proof entity is a user's personal electronic device;
   the method comprising the steps of:
   acquiring candidate authentication data on an individual by acquisition means of the proof entity or by acquisition means of a trusted entity;
   wherein after said acquiring, said proof entity has said candidate authentication data or said candidate authentication data is provided to said proof entity by said trusted entity;
   (a) generation by a processor of the proof entity of:
      a signature of the proof entity from said secret key;
      a zero-knowledge proof of the fact that the candidate authentication data and the reference authentication data match;
   (b) transmission to the verification entity of transaction data comprising at least:
      said signature of the proof entity;
      said zero-knowledge proof,
   (c) verification by a processor of the verification entity that said signature of the proof entity and the zero-knowledge proof are valid in order to ensure that the transaction is not fraudulent;
   (d) if verification of step (c) is conclusive, performing, by the processor of the verification entity, said transaction in the blockchain database, step (d) comprising the generation of a block containing said transaction data transmitted in step (b) and the addition of said block in said blockchain database.

2. The method according to claim 1, wherein the proof entity also has the reference authentication data and/or a hash value of the reference authentication data, said transaction data transmitted in step (b) further comprising said hash value of the reference authentication data, and step (c) comprising the verification by the processor of the verification entity that the hash value received of the reference authentication data corresponds to the one in possession of the verification entity.

3. The method according to claim 2, wherein the proof entity initially has only the reference authentication data and the hash value of the reference authentication data, the method comprising the implementation by a data processor of a trusted entity or of the proof entity of a preliminary step (a1) of:
   obtaining the candidate authentication data;
   generating the hash value of the candidate authentication data obtained.

4. The method according to claim 3, comprising an even earlier step (a0) of generation by the processor of the proof entity of the reference biometric data from a reference biometric trait associated with an official document and of the hash value of the reference biometric data.

5. The method according to claim 1, wherein the zero-knowledge proof is a zkSNARK type cryptographic object, wherein zkSNARK means "zero-knowledge Succinct Non Interactive ARgument of Knowledge."

6. The method according to claim 1, wherein step (a) comprises the prior verification that the candidate authentication data and the reference authentication data match.

7. The method according to claim 1, wherein the candidate and reference authentication data are candidate and reference biometric data, the proof entity having, in addition to the reference biometric data, a hash value of the candidate biometric data and of the hash value of the reference biometric data, said transaction data transmitted to step (b) further comprising said hash value of the candidate biometric data.

8. The method according to claim 6, wherein the candidate and reference authentication data are candidate and reference biometric data, the proof entity having, in addition to the reference biometric data, a hash value of the candidate biometric data and of the hash value of the reference biometric data, said transaction data transmitted to step (b) further comprising said hash value of the candidate biometric data, and the candidate biometric data and the reference biometric data match if their distance according to a given comparison function is less than a predetermined threshold.

9. The method according to claim 8, wherein said zero-knowledge proof of the fact that the candidate biometric data and the reference biometric data match is a zero-knowledge proof of the fact that, given two hash values, there is a candidate biometric data and a reference biometric data having for respective hash values the given hash values, such that their distance according to the given comparison function is less than the predetermined threshold.

10. The method according to claim 6, wherein the candidate and reference authentication data are a candidate code and a reference code, the candidate code and the reference code matching if their hash values correspond.

11. The method according to claim 10, wherein said zero-knowledge proof of the fact that the candidate code and the reference code match is a zero-knowledge proof of the fact that, given a hash value, there is a candidate code having for hash value a hash value of the candidate code corresponding to said given hash value.

12. The method according to claim 1, wherein the proof entity is a bank card, a mobile terminal or a personal computer.

13. A system for performing a transaction in a blockchain database sent from a proof entity having at least one secret key, comprising said proof entity and a verification entity, said proof entity being connected to the verification entity, wherein:
   the proof entity comprises a processor configured to generate a signature of the proof entity from said secret key, and a zero-knowledge proof of the fact that a candidate authentication data acquired on an individual and a reference authentication data match, and to transmit to the verification entity transaction data comprising at least said signature of the proof entity and said zero-knowledge proof, wherein the proof entity is a user's personal electronic device;
   the verification entity comprises a processor configured to verify that said signature of the proof entity and the zero-knowledge proof are valid in order to ensure that the transaction is not fraudulent and configured to perform the transaction in the blockchain database by generating a block containing the transaction data and the adding said block in said blockchain database; and wherein the system comprises acquisition means comprised in a trusted entity and/or acquisition means comprised in the proof entity, the acquisition means being configured to acquire on an individual the candidate authentication data.

14. The system according to claim 13, wherein the proof entity is a bank card, a mobile terminal or a personal computer.

\* \* \* \* \*